United States Patent
Srikanta Prasad et al.

(10) Patent No.: US 12,534,210 B2
(45) Date of Patent: Jan. 27, 2026

(54) STACKED INFLATABLE TUBES AND METHODS OF FORMING STACKED INFLATABLE TUBES FOR EVACUATION ASSEMBLIES

(71) Applicant: GOODRICH CORPORATION, Charlotte, NC (US)

(72) Inventors: Guruprasad Srikanta Prasad, Bangalore (IN); Adithya Nagara Venkatachala, Shivamogga (IN)

(73) Assignee: GOODRICH CORPORATION, Charlotte, NC (US)

( * ) Notice: Subject to any disclaimer, the term of this patent is extended or adjusted under 35 U.S.C. 154(b) by 842 days.

(21) Appl. No.: 17/853,595

(22) Filed: Jun. 29, 2022

(65) Prior Publication Data
US 2023/0192301 A1    Jun. 22, 2023

(30) Foreign Application Priority Data
Dec. 17, 2021   (IN) .............................. 202141059010

(51) Int. Cl.
*B29C 65/50*       (2006.01)
*B29C 65/00*       (2006.01)
(Continued)

(52) U.S. Cl.
CPC .............. *B64D 25/14* (2013.01); *B29C 65/04* (2013.01); *B29C 65/5042* (2013.01);
(Continued)

(58) Field of Classification Search
CPC ... B29C 65/50; B29C 65/5042; B29C 53/387; B29C 53/36; B29C 53/38; B29C 53/385; B29C 66/54; B29C 66/5412; B29C 66/547; B29C 66/53241; B29L 2022/02; B63C 2009/042; B64D 25/14; E04H 2015/202; E04H 2015/204; E04H 2015/205; E04H 15/20
See application file for complete search history.

(56) References Cited

U.S. PATENT DOCUMENTS 2,689,812 A  *  9/1954  Mollica .................. B29D 22/02
                                                    156/251
2,764,766 A  *  10/1956 Boyle ...................... B63C 9/04
                                                    182/138

(Continued)

OTHER PUBLICATIONS

European Patent Office, European Search Report dated Apr. 12, 2023 in Application No. 22211244.3.
(Continued)

*Primary Examiner* — Jessica L Laux
(74) *Attorney, Agent, or Firm* — SNELL & WILMER L.L.P.

(57) ABSTRACT

An inflatable stacked tube assembly may comprise a first panel and a second panel. The first panel may form a first portion of a top tube and a first portion of a bottom tube. The second panel may form a second portion of the top tube and a second portion of the bottom tube. A first seam tape may be bonded to a first top tube interior surface portion of the first panel and a second top tube interior surface portion of the second panel. The first seam tape may be located along a first fold formed by the first panel and along a second fold formed by the second panel.

20 Claims, 13 Drawing Sheets

(51) Int. Cl.
   *B29C 65/04*     (2006.01)
   *B64D 25/14*     (2006.01)
   *B29L 22/02*     (2006.01)

(52) U.S. Cl.
   CPC .......... *B29C 66/522* (2013.01); *B29C 66/536* (2013.01); *B29L 2022/02* (2013.01)

(56) References Cited

U.S. PATENT DOCUMENTS

| | | | |
|---|---|---|---|
| 3,056,980 A | | 10/1962 | Holladay |
| 3,517,401 A | * | 6/1970 | Lee ............ B63C 9/02 |
| | | | 441/40 |
| 3,870,006 A | * | 3/1975 | Hashimoto ............ B63B 39/06 |
| | | | 441/35 |
| 3,919,027 A | * | 11/1975 | Jones ............ B29C 53/36 |
| | | | 156/203 |
| 5,360,186 A | | 11/1994 | Danielson et al. |
| 5,397,258 A | * | 3/1995 | Switlik ............ B63C 9/04 |
| | | | 441/40 |
| 5,419,726 A | | 5/1995 | Switlik et al. |
| 6,298,970 B1 | * | 10/2001 | Targiroff ............ B64D 25/14 |
| | | | 193/25 B |
| 6,698,545 B2 | | 3/2004 | Baker et al. |
| 9,376,180 B2 | | 6/2016 | Swierkocki et al. |
| 10,195,791 B1 | | 2/2019 | Reeves et al. |

OTHER PUBLICATIONS

European Patent Office, European Office Action dated Apr. 18, 2024 in Application No. 22211244.3.

* cited by examiner

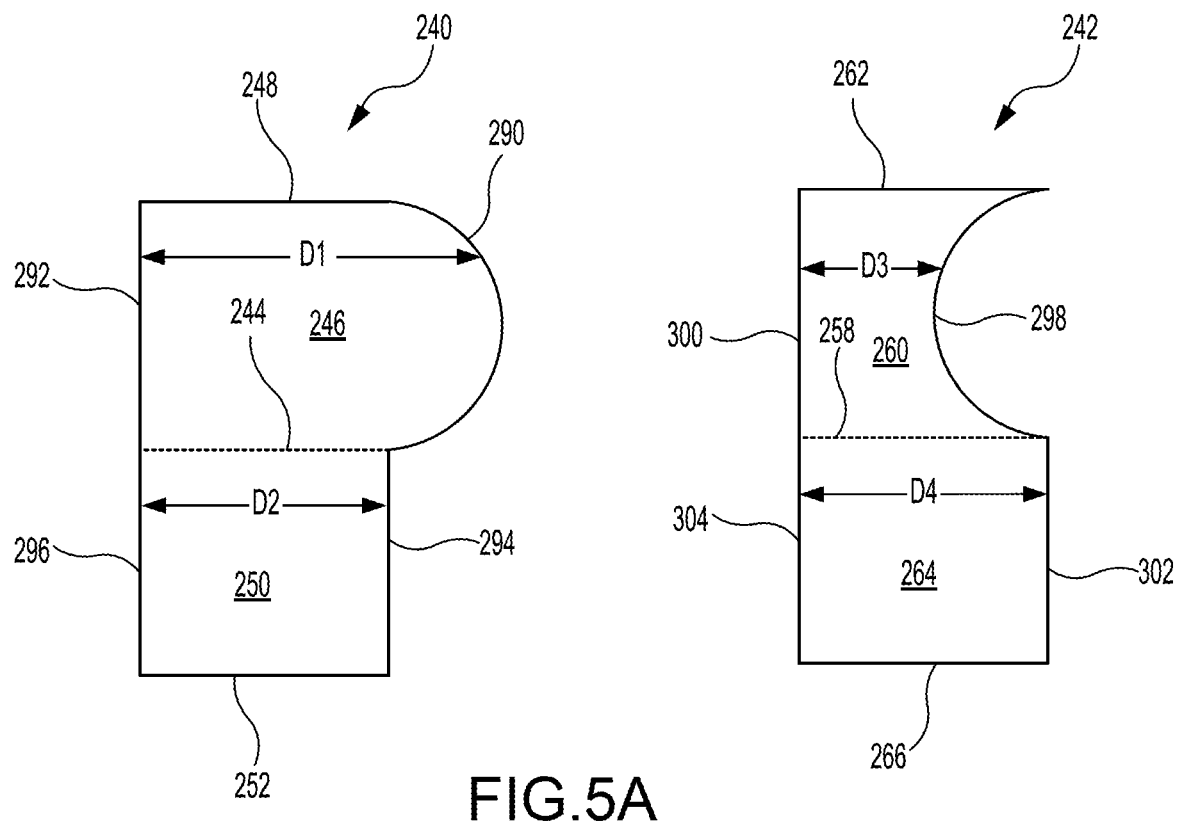
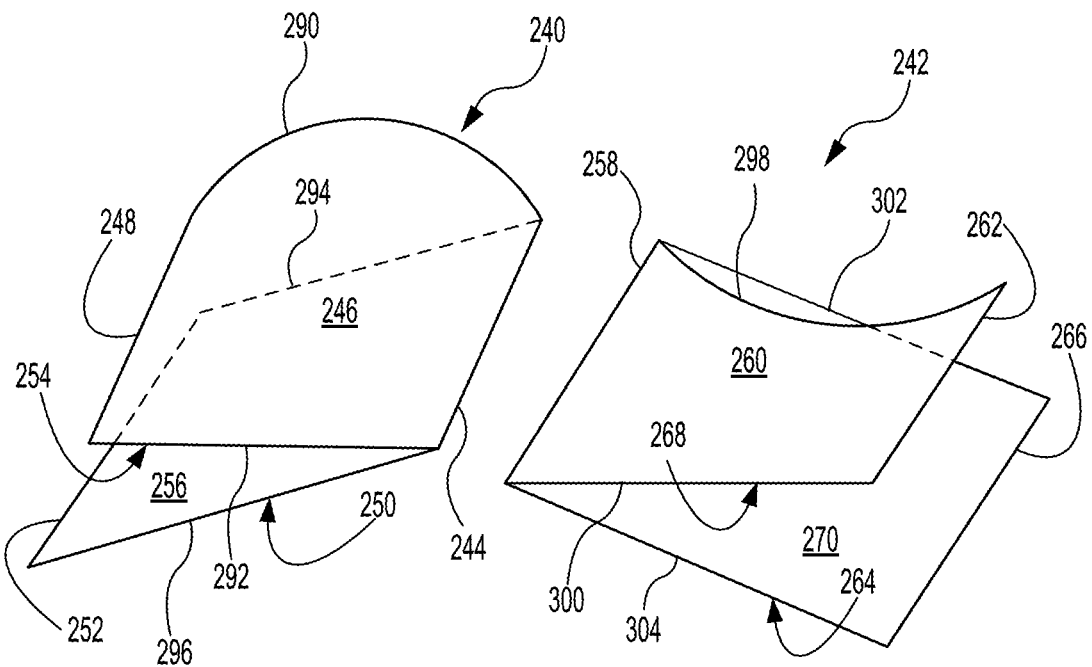
FIG.5A
FIG.5B

STACKED INFLATABLE TUBES AND METHODS OF FORMING STACKED INFLATABLE TUBES FOR EVACUATION ASSEMBLIES

CROSS-REFERENCE TO RELATED APPLICATIONS

This application claims priority to, and the benefit of, India Patent Application No. 202141059010, filed Dec. 17, 2021 (DAS Code CD29) and titled "STACKED INFLATABLE TUBES AND METHODS OF FORMING STACKED INFLATABLE TUBES FOR EVACUATION ASSEMBLIES," which is incorporated by reference herein in its entirety for all purposes.

FIELD

The present disclosure relates to inflatable assemblies and, in particular, to stacked inflatable tubes and methods of forming stacked inflatable tubes.

BACKGROUND

Emergency evacuation systems, including inflatable evacuation slides, may be used to exit an aircraft absent a jet way or other suitable means of egress for passengers. The evacuation slides may deploy from, for example, the door or side of an aircraft fuselage. In the event of a water landing, the inflatable evacuation slide may be employed as a life raft. The evacuation slides generally include a top inflatable tube stacked on a bottom inflatable tube. The top and bottom tubes are fluidly sealed from one another, such that a hole or leakage in one of the tubes does not affect the other tube.

Current assembly methods generally include joining the top tube to the bottom tube by forming an adhesive bond between a bottom surface of the top tube and a top surface of the bottom tube. A tape (sometimes referred to a "V-tape") may be coupled between the top tube and bottom tube on both sides of the adhesive bond to strengthen the bonding of the top tube to the bottom tube and to convert the loading into shear loading. Currently, the joining of top tube and the bottom tube is performed by manual adhesive bonding and V-tape application, which is labor intensive and is associated with increased manufacturing times. Further, the joint/coupling between the upper tube and the bottom tube cannot be heat sealed and/or radio frequency (RF) welded due to the aluminum coating applied to the fabric on the outer surface of tubes for flame retardance. Additionally, inspection of the adhesive bond can be challenging, as it is blocked from view by the fabric of the tubes and the V-tape. Being unable to inspect the adhesive bond can lead to defects (e.g., channels, wrinkles, non-bonded areas) between the upper tube and the lower tube not being detected.

SUMMARY

An inflatable stacked tube assembly is disclosed herein. In accordance with various embodiments, the inflatable stacked tube assembly may comprise a first panel forming a first portion of a top tube and a first portion of a bottom tube, a second panel forming a second portion of the top tube a second portion of the bottom tube, and a first seam tape bonded to a first top tube interior surface portion of the first panel and a second top tube interior surface portion of the second panel. The first seam tape may be located along a first fold formed by the first panel and along a second fold formed by the second panel.

In various embodiments, a second seam tape may be bonded to a first bottom tube interior surface portion of the first panel and a second bottom tube interior surface portion of the second panel. The second seam tape may be located along the first fold of the first panel and along the second fold of the second panel.

In various embodiments, a third seam tape may be bonded to the first top tube interior surface portion of the first panel and the second top tube interior surface portion of the second panel. The third seam tape may be located along a first circumferential end of the first panel and along a first circumferential end of the second panel.

In various embodiments, a fourth seam tape may be bonded to the first bottom tube interior surface portion of the first panel and the second bottom tube interior surface portion of the second panel. The fourth seam tape may be located along a second circumferential end of the first panel and along a second circumferential end of the second panel.

In various embodiments, the first panel may form approximately 180° of the top tube and 180° of the bottom tube. In various embodiments, a first longitudinal end of the first panel may be formed as a convex curve and a first longitudinal end of the second panel may be formed as a concave curve. The first longitudinal end of the first panel may extend from the first fold to the first circumferential end of the first panel. The first longitudinal end of the second panel may extend from the second fold to the first circumferential end of the second panel.

In various embodiments, a first top tube exterior surface portion of the first panel and a second top tube exterior surface portion of the second panel may each include an aluminum coating. The first top tube exterior surface portion of the first panel is opposite the first top tube interior surface portion of the first panel, and the second top tube exterior surface portion of the second panel is opposite the second top tube interior surface portion of the second panel.

An inflatable stacked tube assembly, in accordance with various embodiments, may comprise a first panel forming a top tube, and a second panel bonded to the first panel and forming a portion of a bottom tube. The first panel may include a first fold, a second fold, a first top tube interior surface portion, a first flange, and a second flange, The first top tube interior surface portion may extend from the first fold to the second fold. The first flange may extend from the first fold to a first circumferential end of the first panel. The second flange may extend from the second fold to a second circumferential end of the first panel. The second panel may include a bottom tube interior surface portion extending from a first circumferential end of the second panel to a second circumferential end of the second panel. A first seam tape may be bonded to the first top tube interior surface portion. The first seam tape may be located along the first fold and along the second fold.

In various embodiments, a second seam tape may be bonded to a first bottom tube interior surface portion of the first flange and a second bottom tube interior surface portion of the second flange. The second seam tape may be located along the first fold and along the second fold.

In various embodiments, a third seam tape may be bonded to the first bottom tube interior surface portion of the first flange and the bottom tube interior surface portion of the second panel. The third seam tape may be located along the first circumferential end of the first panel and along the first circumferential end of the second panel.

In various embodiments, a fourth seam tape may be bonded to the second bottom tube interior surface portion of the second flange and the bottom tube interior surface portion of the second panel. The fourth seam tape may be located along the second circumferential end of the first panel and along the second circumferential end of the second panel.

In various embodiments, a first portion of a top longitudinal end of the first panel may form a convex curve, and a second portion of the top longitudinal end of the first panel may form a concave curve. The top longitudinal end may extend from the first fold to the second fold. In various embodiments, the second panel may form between approximately 180° and 340° of the bottom tube.

A method of forming an inflatable stacked tube assembly is also disclosed herein. In accordance with various embodiments, the method may comprise folding a first panel to form a first fold and orient a first top tube exterior surface portion of the first panel toward a first bottom tube exterior surface portion of the first panel, folding a second panel to form a second fold and orient a second top tube exterior surface portion of the second panel toward a second bottom tube exterior surface portion of the second panel, and bonding a first seam tape to a first top tube interior surface portion of the first panel and a second first top tube interior surface portion of the second panel. The first seam tape may be located along the first fold and the along the second fold. The first top tube interior surface portion and the first top tube exterior surface portion may each extend from the first fold to a first circumferential end of the first panel, and the second top tube interior surface portion and the second top tube exterior surface portion may each extend from the second fold to a first circumferential end of the second panel. The method may further include bonding a second seam tape to a first bottom tube interior surface portion of the first panel and a second bottom tube interior surface portion of the second panel. The second seam tape may be located along the first fold and the along the second fold. The first bottom tube interior surface portion and the first bottom tube exterior surface portion may each extend from the first fold to a second circumferential end of the first panel, and the second bottom tube interior surface portion and the second bottom tube exterior surface portion may each extend from the second fold to a second circumferential end of the second panel. The method may further include coupling the first circumferential end of the first panel to the first circumferential end of the second panel and coupling the second circumferential end of the first panel to the second circumferential end of the second panel.

In various embodiments, coupling the first circumferential end of the first panel to the first circumferential end of the second panel may comprise bonding a third seam tape to the first top tube interior surface portion of the first panel and bonding the third seam tape to the second top tube interior surface portion of the second panel. wherein the third seam tape may be located along the first circumferential end of the first panel and along the first circumferential end of the second panel.

In various embodiments, coupling the second circumferential end of the first panel to the second circumferential end of the second panel may comprise bonding a fourth seam tape to the first bottom tube interior surface portion of the first panel and bonding the fourth seam tape to the second bottom tube interior surface portion of the second panel. The fourth seam tape may be located along the second circumferential end of the first panel and along the second circumferential end of the second panel.

In various embodiments, the method may further comprise using at least one of radio frequency welding or heat bonding to bond the first seam tape to the first top tube interior surface portion of the first panel and the second first top tube interior surface portion of the second panel.

In various embodiments, the method may further comprise forming a top longitudinal end of the first panel as a convex curve. The top longitudinal end of the first panel may extend from the first fold to the first circumferential end of the first panel. In various embodiments, the method may further comprise forming a top longitudinal end of the second panel as a concave curve. The top longitudinal end of the second panel may extending from the first fold to the first circumferential end of the first panel. In various embodiments, the method may further comprise bonding an inflatable tube to the top longitudinal end of the first panel and the top longitudinal end of the second panel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 5A, 5B, 5C, and 5D illustrate formation of an inflatable stacked tube assembly having a miter joint end, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface cross hatching lines may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of clarity.

Disclosed herein are stacked tube assemblies and methods of forming the same. The disclosed methods and stacked tube assemblies may find particular use in connection with inflatable evacuation slides. However, various aspects of the disclosed embodiments may be adapted for performance in a variety of other inflatable assemblies, for example, with inflatable life rafts and/or other structures wherein a first inflatable tube is located on and is fluidly sealed from a second inflatable tube. As such, numerous applications of the present disclosure may be realized.

Figure 1:
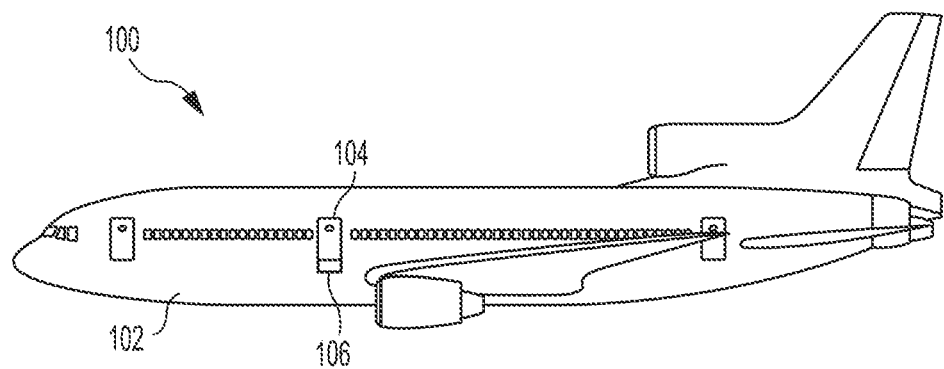
FIG. 1 illustrates an aircraft having an evacuation system, in accordance with various embodiments.

With reference to FIG. 1, an aircraft 100 is shown. Aircraft 100 may include a fuselage 102 having plurality of exit doors, including an exit door 104. Aircraft 100 may include one or more evacuation systems positioned near a corresponding exit door. For example, aircraft 100 includes an evacuation system 106 positioned near exit door 104. In the event of an emergency, exit door 104 may be opened by a passenger or crew member of aircraft 100. Evacuation system 106 may deploy in response to exit door 104 being opened and/or in response to an action taken by a passenger or crew member such as depression of a button or actuation of a lever. While evacuation system 106 is disclosed as deploying from exit door 104, it is further contemplated and understood that evacuation system 106 may deploy from other locations. For example, evacuation system 106 may deploy from a wing of aircraft 100 or other areas on the aircraft fuselage.

Figure 2A:
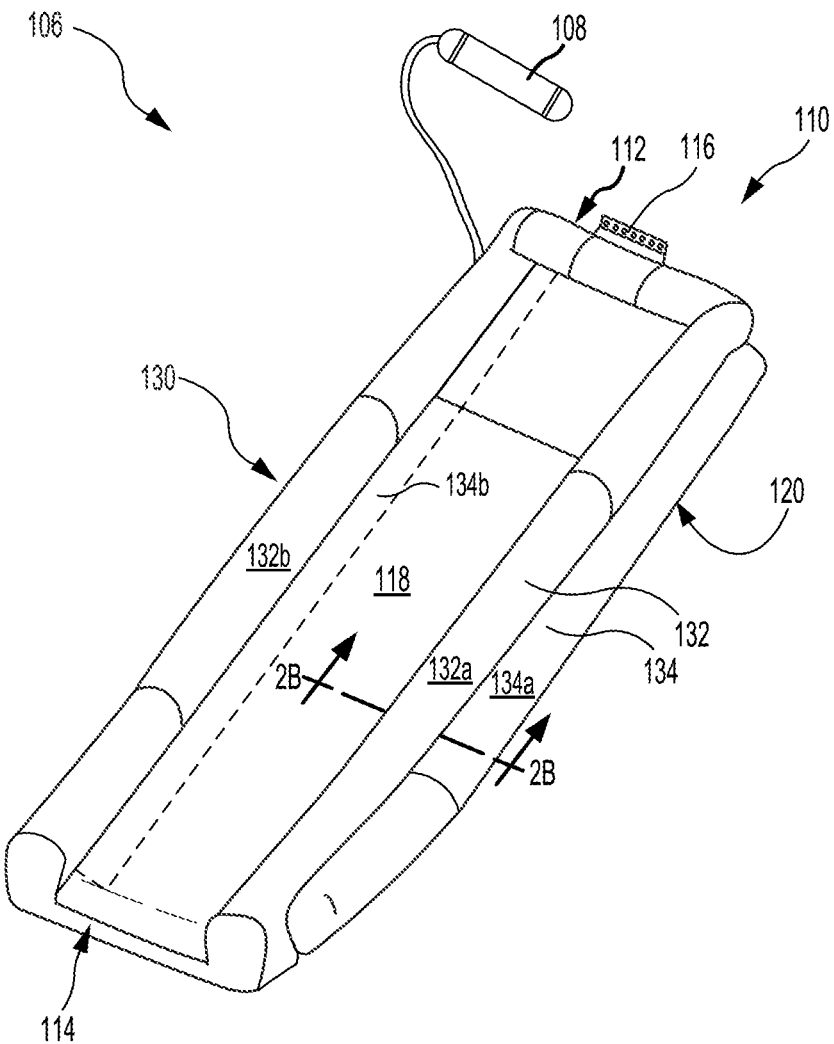
FIG. 2A illustrates a perspective view of an evacuation slide in an inflated state, in accordance with various embodiments.

With reference to FIG. 2A, evacuation system 106 is illustrated in a deployed position. In accordance with various embodiments, evacuation system 106 includes an inflatable evacuation slide 110. Evacuation slide 110 may be deployed from aircraft 100 in FIG. 1. Evacuation system 106 may further include a compressed fluid source 108. Fluid source 108 is fluidly coupled to evacuation slide 110. Fluid source 108 provides a pressurized gas to inflate evacuation slide 110.

In accordance with various embodiments, evacuation slide 110 includes a head end 112 and a toe end 114 opposite head end 112. Head end 112 may be coupled to a structure (e.g., a door sill) of aircraft 100 in FIG. 1 via a girt 116. Evacuation slide 110 includes a sliding surface 118 and an underside surface 120 opposite sliding surface 118. Sliding surface 118 extends from head end 112 to toe end 114 of evacuation slide 110. During an evacuation event, underside surface 120 is oriented generally towards the exit surface, which may comprise a ground surface or, in the event of a water landing, a body of water.

Evacuation slide 110 includes an inflatable rail structure 130. In accordance with various embodiment, inflatable rail structure 130 includes a first (or top) rail 132 and a second (or bottom) rail 134. As used herein, "bottom" refers to the tube that is located closer to the exit surface upon deployment, and "top" refers to the tube located over the bottom tube, such that the bottom tube is located between the top tube and the exit surface. In accordance with various embodiments, "top" refers to the tube that is located over sliding surface 118 and "bottom" refers to the tube that is located over underside surface 120. In this regard, a top tube extends away from the bottom tube and away from sliding surface 118 in a first direction (the first direction being normal to sliding surface 118), and a bottom tube extends away from the top tube and away from underside surface 120 in a second direction that is opposite the first direction.

First rail 132 is stacked on second rail 134. In this regard, inflatable rail structure 130 may be a stacked tube assembly. During an evacuation event, second rail 134 may be located generally proximate (i.e., closer to) the exit surface, as compared to first rail 132. Stated differently, when evacuation slide 110 is in a deployed position, second rail 134 may be located generally under first rail 132. Each of first and second rails 132, 134 may comprise generally cylindrically shaped tubes. First rail 132 includes a first top longitudinal tube 132a and a second top longitudinal tube 132b. First and second top longitudinal tubes 132a, 132b may each extend from head end 112 to toe end 114 of evacuation slide 110. Second rail 134 includes a first bottom longitudinal tube 134a and a second bottom longitudinal tube 134b. First and second bottom longitudinal tubes 134a, 134b may each extend from head end 112 to toe end 114 of evacuation slide 110. First rail 132 may be fluidly sealed from second rail 134. First and second rails 132, 134 provide a degree of redundancy in that each rail may be independently capable of supporting the weight of evacuees without buckling, when evacuation slide 110 is being used as a slide, and/or without sinking when filled to capacity with evacuees when evacuation slide 110 is used as a life raft.

Figure 2B:
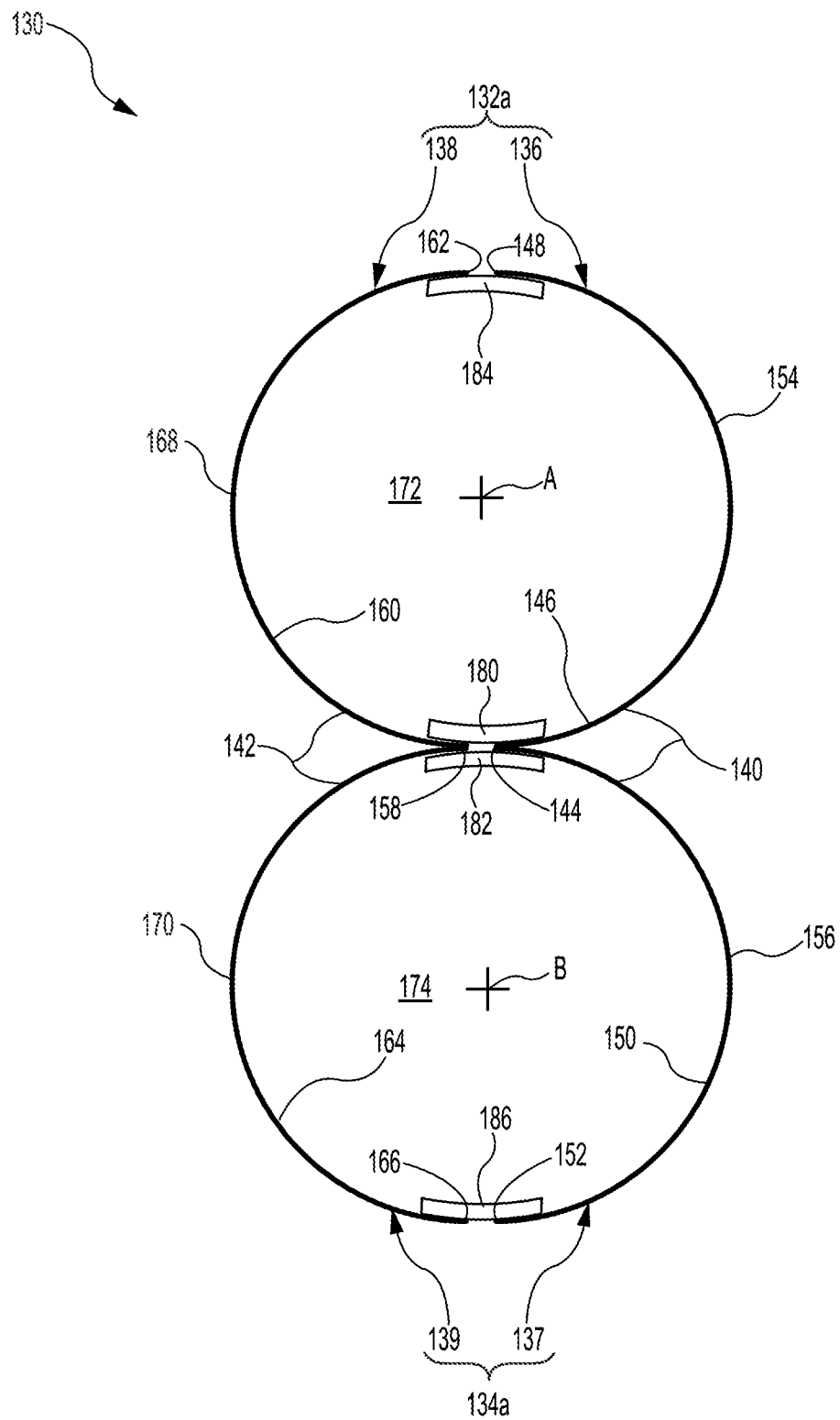
FIG. 2B illustrates a cross-section of the inflatable rail structure take along the line 2B-2B in FIG. 2A, in accordance with various embodiments

With reference to FIG. 2B, a cross-section of inflatable rail structure 130 is illustrated. In accordance with various embodiments, a first panel 140 forms a first portion 136 of first top longitudinal tube 132a and a first portion 137 of first bottom longitudinal tube 134a. First panel 140 may form approximately 180° of first top longitudinal tube 132a and approximately 180° of first bottom longitudinal tube 134a. As used in the previous context only, the term "approximately" means ±5°. A second panel 142 forms a second portion 138 of first top longitudinal tube 132a and a second portion 139 of first bottom longitudinal tube 134a. Second panel may form approximately 180° of first top longitudinal tube 132a and approximately 180° of first bottom longitudinal tube 134a. As used in the previous context only, the term "approximately" means ±5°. In accordance with various embodiments, first panel 140 is folded. In other words, first panel 140 includes a fold, or crease, 144.

A top tube interior surface portion 146 of first panel 140 extends from fold 144 to a first circumferential end 148 of first panel 140. A bottom tube interior surface portion 150 of first panel 140 extends from fold 144 to a second circumferential end 152 of first panel 140. First circumferential end 148, second circumferential end 152 and fold 144 each extend in the longitudinal direction. In this regard, first circumferential end 148, second circumferential end 152 and fold 144 may each extend in a direction substantially parallel to a center axis A about which first top longitudinal tube 132a is curved. As used in the previous context, the term "substantially" means ±5° from parallel. First portion 136 of first top longitudinal tube 132*a* and second portion 138 of first top longitudinal tube 132*a* may together extend approximately 360° about center axis A. As used in the previous context only, the term "approximately" means ±5°. First portion 137 of first bottom longitudinal tube 134*a* and second portion 139 of first bottom longitudinal tube 134*a* may together extend approximately 360° about a center axis B about which first bottom longitudinal tube 134*a*. As used in the previous context only, the term "approximately" means ±5°.

A top tube exterior surface portion 154 of first panel 140 extends from fold 144 to first circumferential end 148 of first panel 140. A bottom tube exterior surface portion 156 of first panel 140 extends from fold 144 to second circumferential end 152 of first panel 140. First circumferential end 148, second circumferential end 152 and fold 144 each extend in the longitudinal direction (e.g., parallel to a center axis A about which first top longitudinal tube 132*a* is curved).

In accordance with various embodiments, second panel 142 is folded. In other words, second panel 142 includes a fold, or crease, 158. A top tube interior surface portion 160 of second panel 142 extends from fold 158 to a first circumferential end 162 of second panel 142. A bottom tube interior surface portion 164 of second panel 142 extends from fold 158 to a second circumferential end 166 of second panel 142. First circumferential end 162, second circumferential end 166, and fold 158 each extend in the longitudinal direction (e.g., substantially parallel to axes A, B).

A top tube exterior surface portion 168 of second panel 142 extends from fold 158 to first circumferential end 162 of second panel 142. A bottom tube exterior surface portion 170 of second panel 142 extends from fold 158 to second circumferential end 166 of second panel 142. Second circumferential end 166 is opposite first circumferential end 162.

Top tube interior surface portions 146, 160 are each oriented radially inward and toward center axis A of first top longitudinal tube 132*a*. Top tube interior surface portion 146 of first panel 140 and top tube interior surface portion 160 of second panel 142 define an inflatable volume, or chamber, 172 of first top longitudinal tube 132*a*. Top tube exterior surface portion 154 of first panel 140 is opposite top tube interior surface portion 146 of first panel 140. Top tube exterior surface portion 168 of second panel 142 is opposite top tube interior surface portion 160 of second panel 142. In this regard, top tube exterior surface portions 154, 168 are each oriented radially outward and away from center axis A of first top longitudinal tube 132*a*.

Bottom tube interior surface portions 150, 164 are each oriented radially inward and toward center axis B of first bottom longitudinal tube 134*a*. Bottom tube interior surface portion 150 of first panel 140 and bottom tube interior surface portion 164 of second panel 142 define an inflatable volume, or chamber, 174 of first bottom longitudinal tube 134*a*. Bottom tube exterior surface portion 156 of first panel 140 is opposite bottom tube interior surface portion 150 of first panel 140. Bottom tube exterior surface portion 170 of second panel 142 is opposite bottom tube interior surface portion 164 of second panel 142. In this regard, bottom tube exterior surface portions 156, 170 are each oriented radially outward and away from center axis B of first bottom longitudinal tube 134*a*.

In accordance with various embodiments, fold 144 of first panel 140 is aligned with fold 158 of second panel 142. A first seam tape 180 may be attached along folds 144, 158, thereby coupling first panel 140 to second panel 142. First seam tape 180 may be bonded to top tube interior surface portions 146, 160. First seam tape 180 extends in the longitudinal direction, substantially parallel to center axes A, B. A second seam tape 182 may also be attached along folds 144, 158, thereby coupling first panel 140 to second panel 142. Second seam tape 182 may be bonded to bottom tube interior surface portions 150, 164. Second seam tape 182 extends in the longitudinal direction, substantially parallel to center axes A, B.

First circumferential end 148 of first panel 140 is aligned with first circumferential end 162 of second panel 142. A third seam tape 184 may be attached along first circumferential ends 148, 162, thereby coupling first panel 140 to second panel 142. Third seam tape 184 may be bonded to top tube interior surface portions 146, 160. Third seam tape 184 extends in the longitudinal direction, substantially parallel to center axes A, B.

Second circumferential end 152 of first panel 140 is aligned with second circumferential end 166 of second panel 142. A fourth seam tape 186 may be attached along second circumferential ends 152, 166, thereby coupling first panel 140 to second panel 142. Fourth seam tape 186 may be bonded to bottom tube interior surface portions 150, 164. Fourth seam tape 186 extends in the longitudinal direction, substantially parallel to center axes A, B.

Figure 3A:
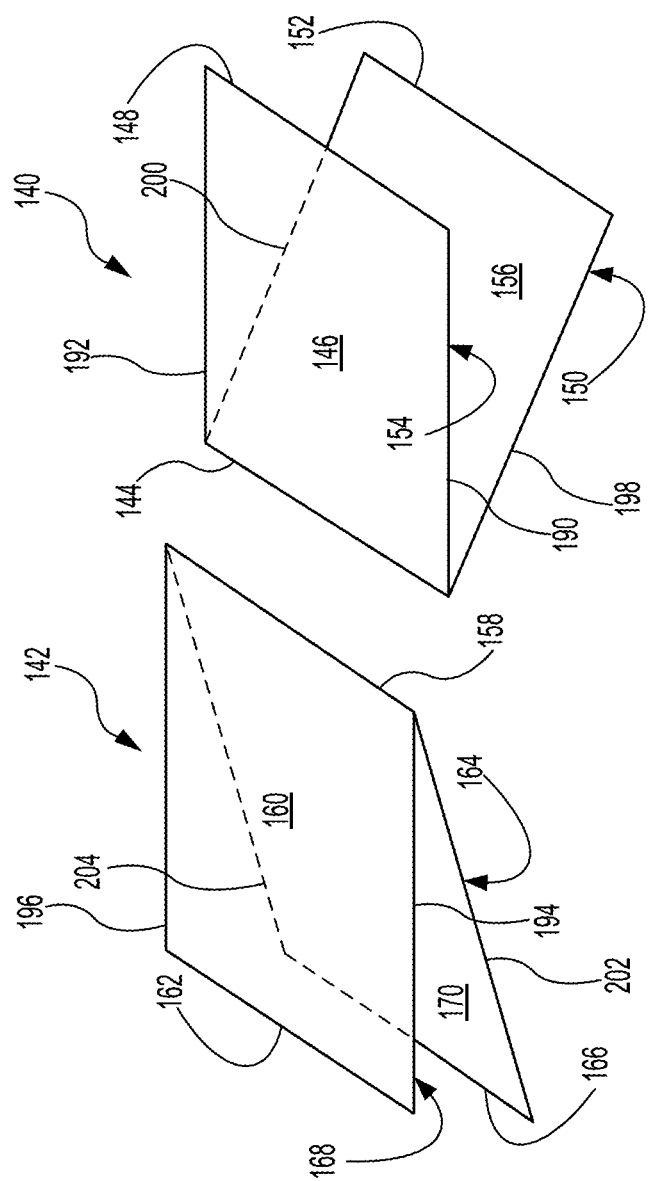
FIGS. 3A, 3B, 3C, 3D, 3E, 3F, 3G, and 3H illustrate formation of an inflatable stacked tube assembly in accordance with various embodiments.

FIGS. 3A, 3B, 3C, 3D, 3E, 3F, 3G, and 3H illustrate formation of inflatable rail structure 130 including first top longitudinal tube 132*a* and first bottom longitudinal tube 134*a*. With reference to FIG. 3A, first panel 140 is folded to form fold 144 with top tube exterior surface portion 154 oriented toward bottom tube exterior surface portion 156.

Second panel 142 is folded to form fold 158 with top tube exterior surface portion 168 oriented toward bottom tube exterior surface portion 170. In various embodiments, top tube exterior surface portion 154 and bottom tube exterior surface portion 156 of first panel 140 and top tube exterior surface portion 168 and bottom tube exterior surface portion 170 of second panel 142 may include an aluminum coating for fire resistance.

First panel 140 includes a first top longitudinal end 190 and a second top longitudinal end 192. First top longitudinal end 190 of first panel 140 is opposite second top longitudinal end 192 of first panel 140. First circumferential end 148 and fold 144 of first panel 140 extend from first top longitudinal end 190 to second top longitudinal end 192. Stated differently, first top longitudinal end 190 and second top longitudinal end 192 each extend from first circumferential end 148 of first panel 140 to fold 144.

Second panel 142 includes a first top longitudinal end 194 and a second top longitudinal end 196. First top longitudinal end 194 of second panel 142 is opposite second top longitudinal end 196 of second panel 142. First circumferential end 162 and fold 158 of second panel 142 extend from first top longitudinal end 194 to second top longitudinal end 196. Stated differently, first top longitudinal end 194 and second top longitudinal end 196 each extend from first circumferential end 162 of second panel 142 to fold 158.

First panel 140 includes a first bottom longitudinal end 198 and a second bottom longitudinal end 200. First bottom longitudinal end 198 of first panel 140 is opposite second bottom longitudinal end 200 of first panel 140. Second circumferential end 152 of first panel 140 and fold 144 extend from first bottom longitudinal end 198 to second bottom longitudinal end 200. Stated differently, first bottom longitudinal end 198 and second bottom longitudinal end 200 each extend from second circumferential end 152 of first panel 140 to fold 144.

Second panel 142 includes a first bottom longitudinal end 202 and a second bottom longitudinal end 204. First bottom longitudinal end 202 of second panel 142 is opposite second bottom longitudinal end 204 of second panel 142. Second circumferential end 166 and fold 158 of second panel 142 extend from first bottom longitudinal end 202 to second bottom longitudinal end 204. Stated differently, first bottom longitudinal end 202 and second bottom longitudinal end 204 each extend from second circumferential end 166 of second panel 142 to fold 158.

Figure 3B:
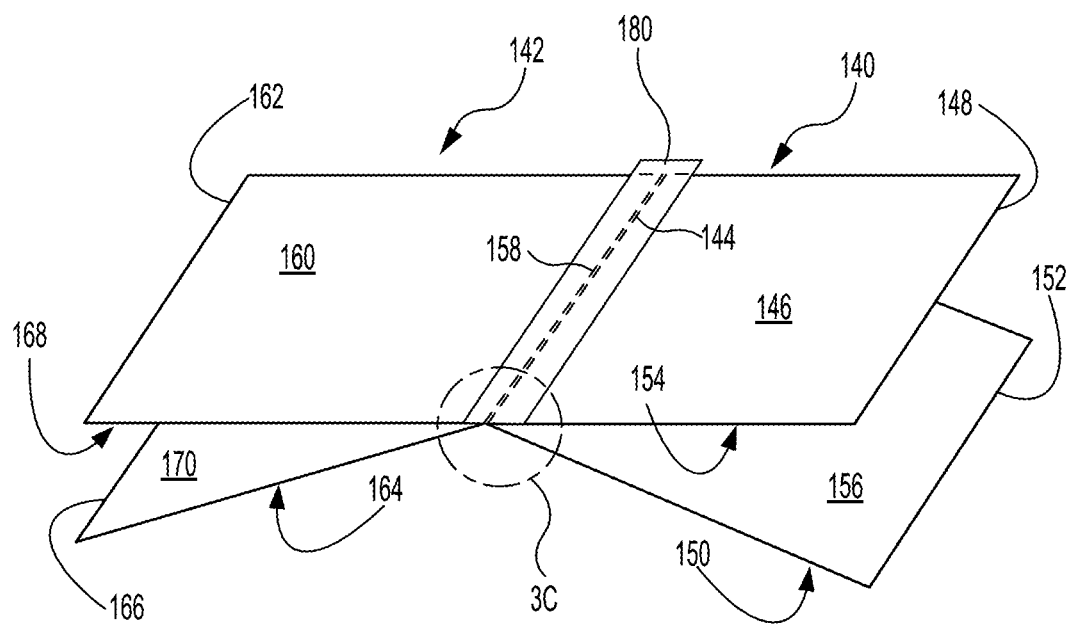
Figure 3C:
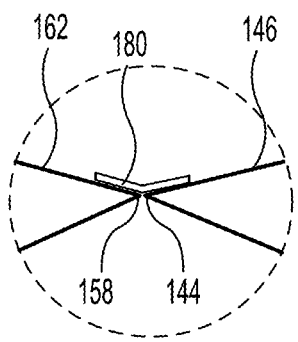

With reference to FIGS. 3B and 3C, first seam tape 180 is bonded along fold 144 to top tube interior surface portion 146 of first panel 140 and along fold 158 to top tube interior surface portion 160 of second panel 142. First seam tape 180 may be bonded to top tube interior surface portions 146, 160 via an adhesive, via radio frequency welding, via heat bonding or via any other suitable bonding means. Radio frequency welding and/or heat bonding may be employed to attach first seam tape 180, as top tube interior surface portions 146, 160 generally do not include aluminum coating.

Figure 3D:
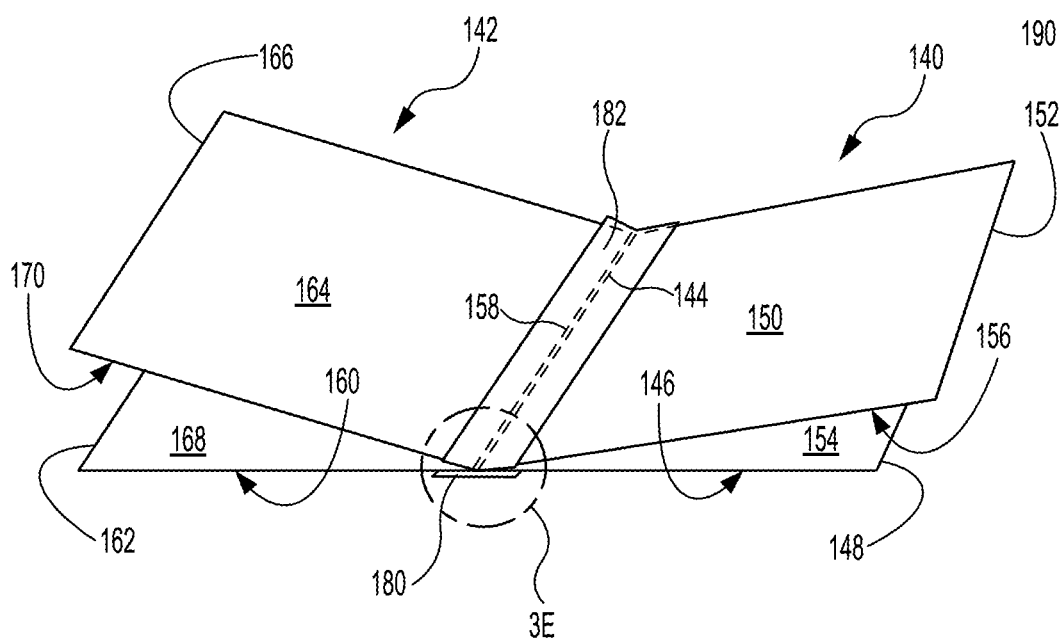
Figure 3E:
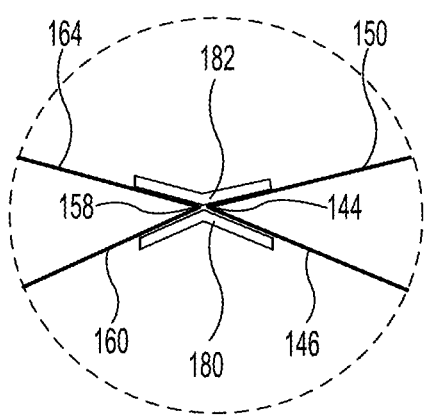

With reference to FIGS. 3D and 3E, second seam tape 182 is bonded along fold 144 to bottom tube interior surface portion 150 of first panel 140 and along fold 158 to bottom tube interior surface portion 164 of second panel 142. Second seam tape 182 may be bonded to bottom tube interior surface portions 150, 164 via an adhesive, via radio frequency welding, via heat bonding or via any other suitable bonding means. Radio frequency welding and/or heat bonding may be employed to attach second seam tape 182, as bottom tube interior surface portions 150, 164 generally do not include aluminum coating.

Figure 3F:
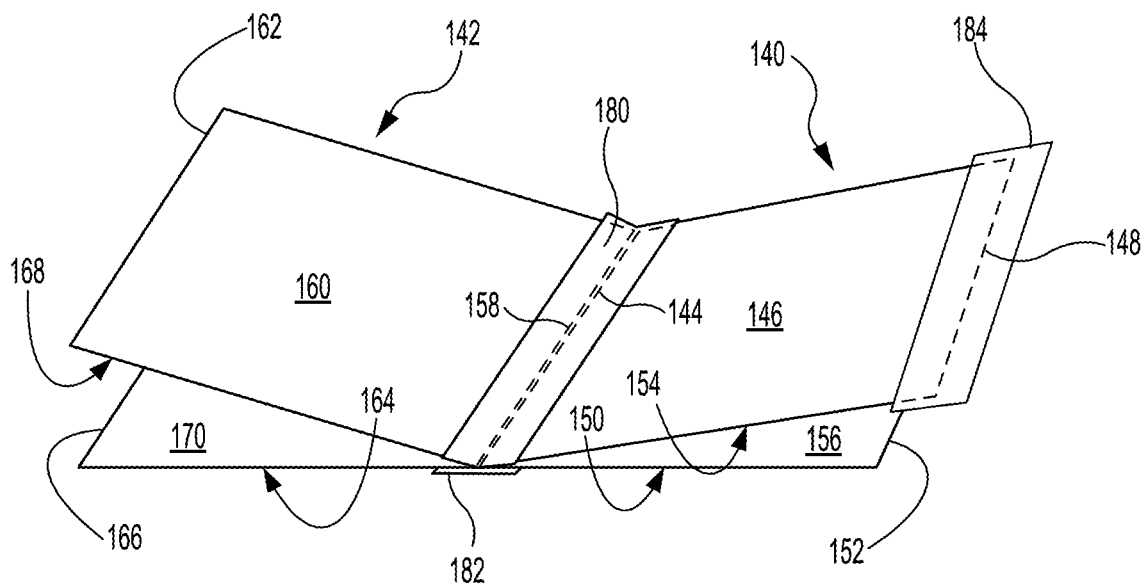

With reference to FIG. 3F, third seam tape 184 is bonded to top tube interior surface portion 146 of first panel 140 along first circumferential end 148. Third seam tape 184 may be bonded to top tube interior surface portion 146 via an adhesive, via radio frequency welding, via heat bonding or via any other suitable bonding means. Radio frequency welding and/or heat bonding may be employed to attach third seam tape 184, as top tube interior surface portion 146 generally does not include aluminum coating.

Figure 3G:
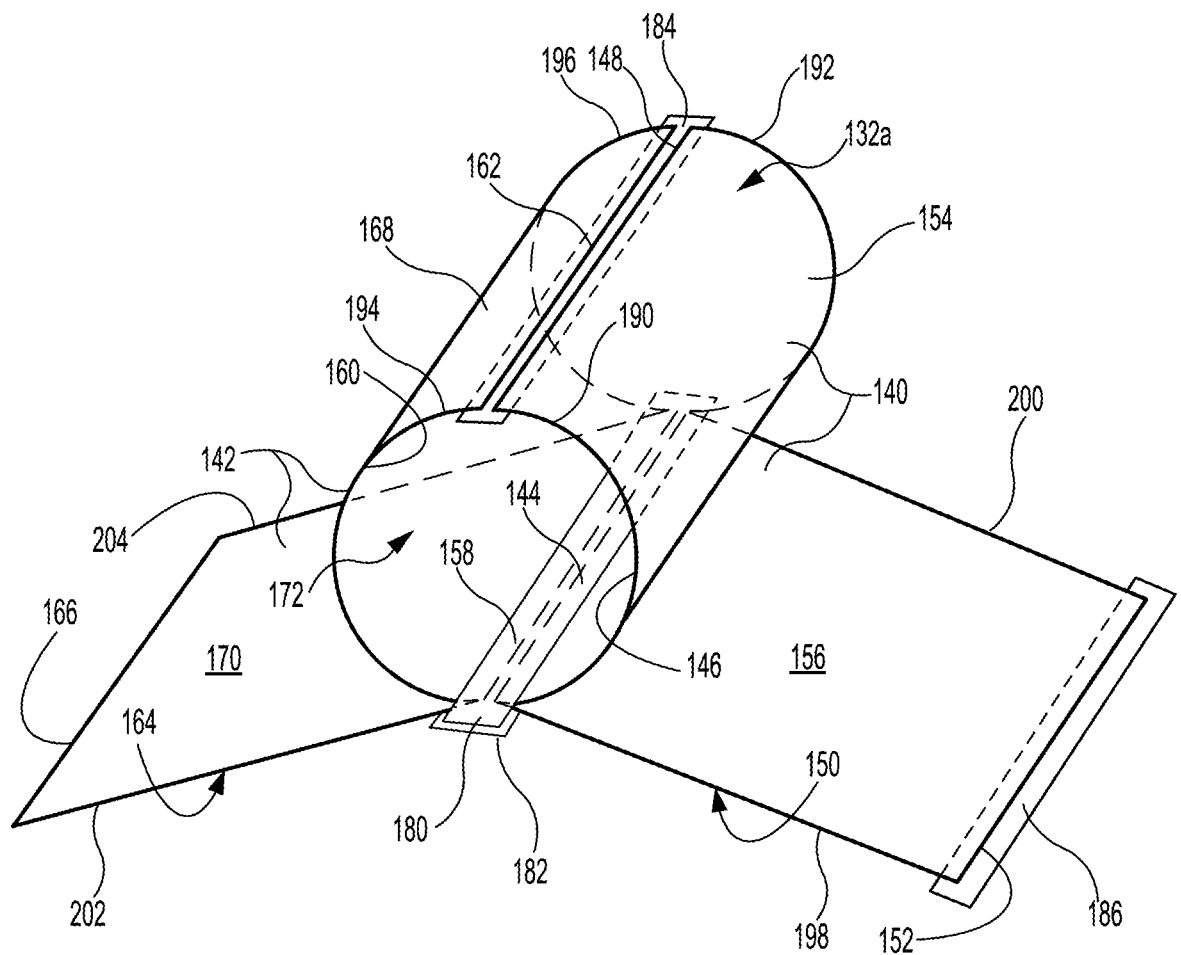

With reference to FIG. 3G, first circumferential end of 148 of first panel 140 and first circumferential end 162 of second panel 142 are brought together. Third seam tape 184 is bonded along first circumferential end 162 to top tube interior surface portion 160 of second panel 142, thereby forming first top longitudinal tube 132a and internal volume 172 of first top longitudinal tube 132a. Third seam tape 184 may be bonded to top tube interior surface portion 160 via an adhesive, via radio frequency welding, via heat bonding or via any other suitable bonding means. Radio frequency welding and/or heat bonding may be employed to attach third seam tape 184, as top tube interior surface portion 160 generally does not include aluminum coating.

Fourth seam tape 186 is bonded to bottom tube interior surface portion 150 of first panel 140 along second circumferential end 152. Fourth seam tape 186 may be bonded to bottom tube interior surface portion 150 via an adhesive, via radio frequency welding, via heat bonding or via any other suitable bonding means. Radio frequency welding and/or heat bonding may be employed to attach fourth seam tape 186, as bottom tube interior surface portion 150 generally does not include aluminum coating.

Figure 3H:
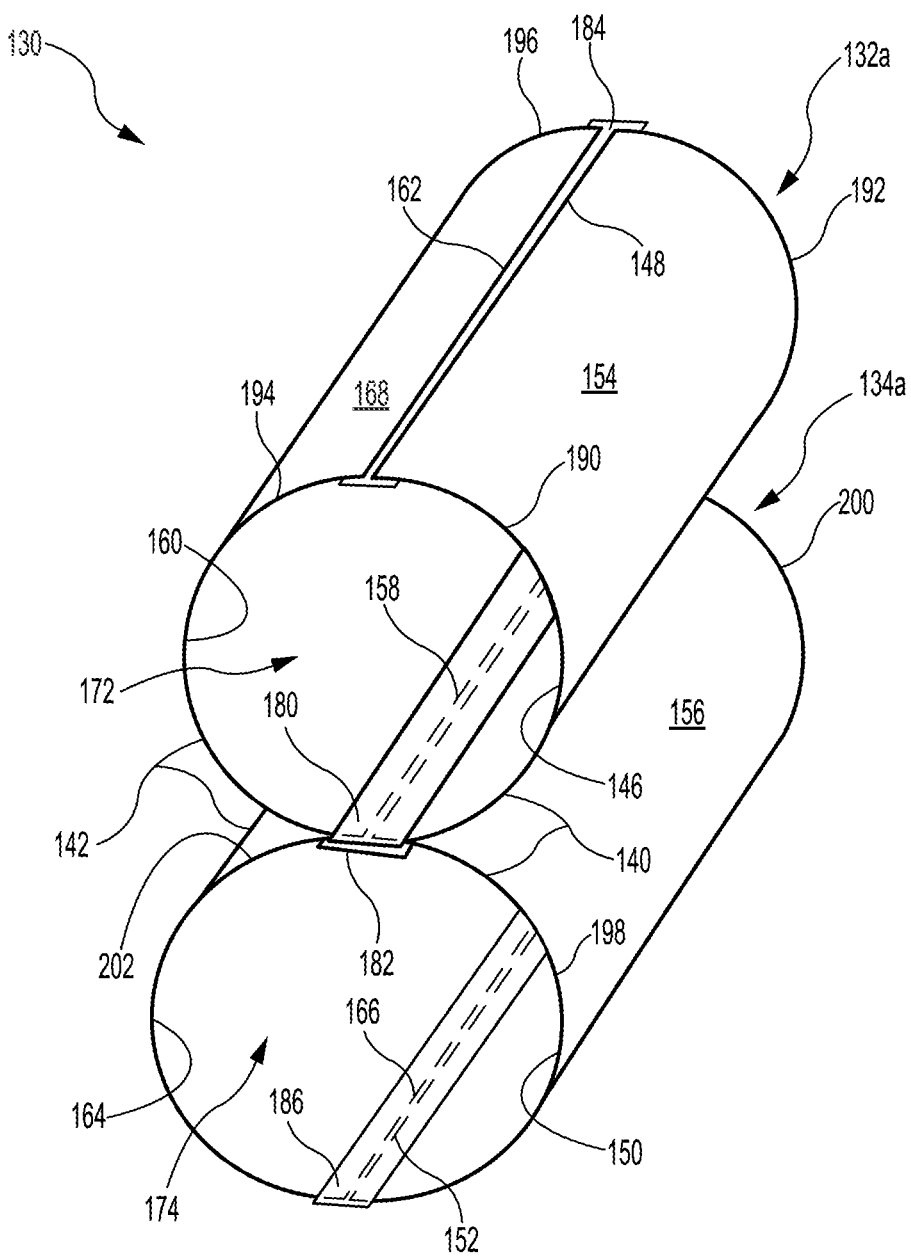

With reference to FIG. 3H, second circumferential end of 152 of first panel 140 and second circumferential end 166 of second panel 142 are brought together. Fourth seam tape 186 is bonded to bottom tube interior surface portion 164 of second panel 142 along second circumferential end 166, thereby forming first bottom longitudinal tube 134a and internal volume 174 of first bottom longitudinal tube 134a. Fourth seam tape 186 may be bonded to bottom tube interior surface portion 164 via an adhesive, via radio frequency welding, via heat bonding or via any other suitable bonding means. Radio frequency welding and/or heat bonding may be employed to attach fourth seam tape 186, as bottom tube interior surface portion 164 generally does not include aluminum coating.

Figure 4:
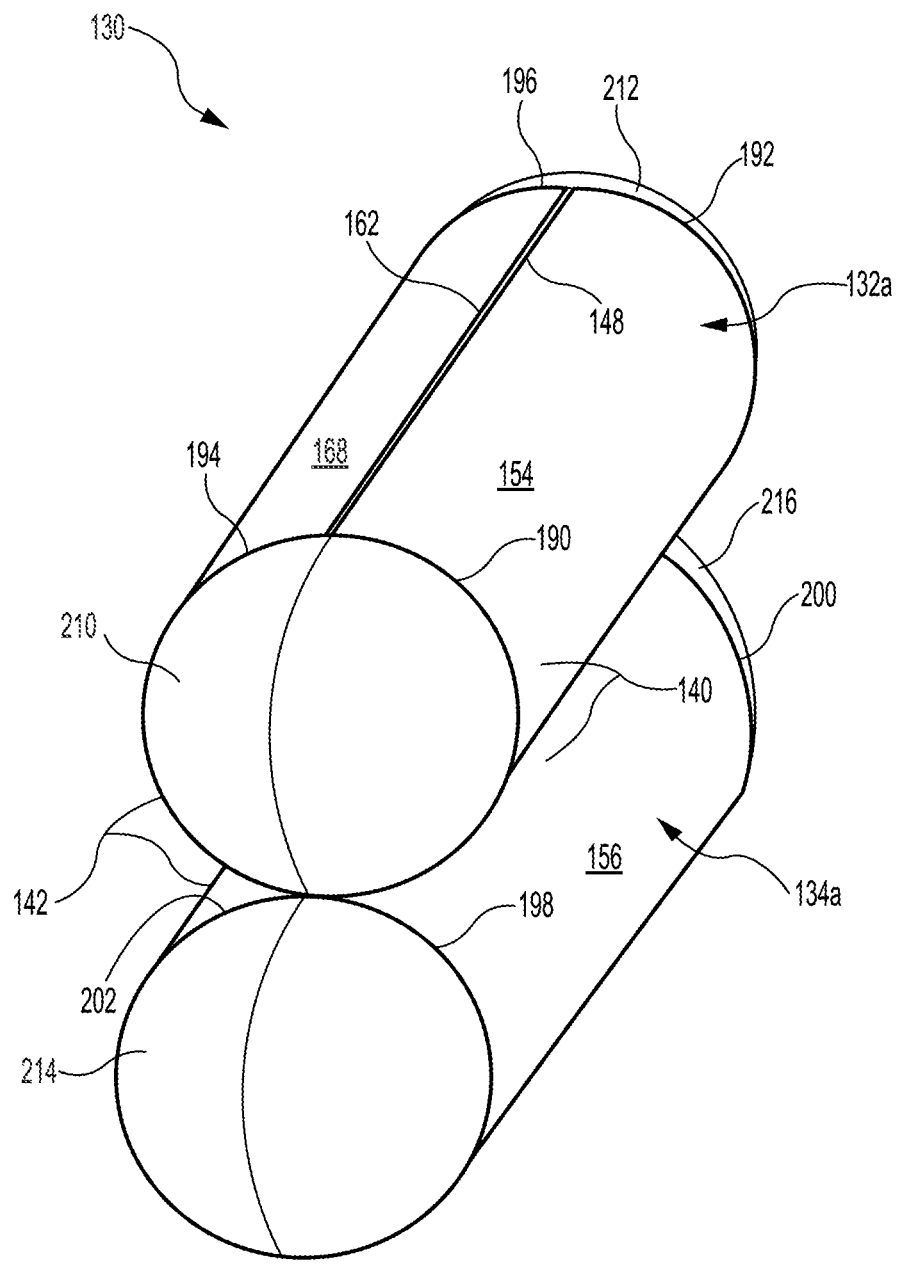
FIG. 4 illustrates an inflatable stacked tube assembly having endcaps, in accordance with various embodiments.

With reference to FIG. 4, in various embodiments, one or more endcap(s) may be attached at the longitudinal ends of first panel 140 and second panel 142. For example, a first top endcap 210 may be bonded to first top longitudinal end 190 of first panel 140 and first top longitudinal end 194 of second panel 142. A second top endcap 212 may be bonded to second top longitudinal end 192 of first panel 140 and second top longitudinal end 196 of second panel 142. A first bottom endcap 214 may be bonded to first bottom longitudinal end 198 of first panel 140 and first bottom longitudinal end 202 of second panel 142. A second bottom endcap 216 may be bonded to second bottom longitudinal end 200 of first panel 140 and second bottom longitudinal end 204 (FIG. 3G) of second panel 142. Endcaps 210, 212, 214, 216 may be bonded to the interior panel surfaces using adhesive, radio frequency welding, heat bonding or any other suitable bonding means.

Figure 5C:
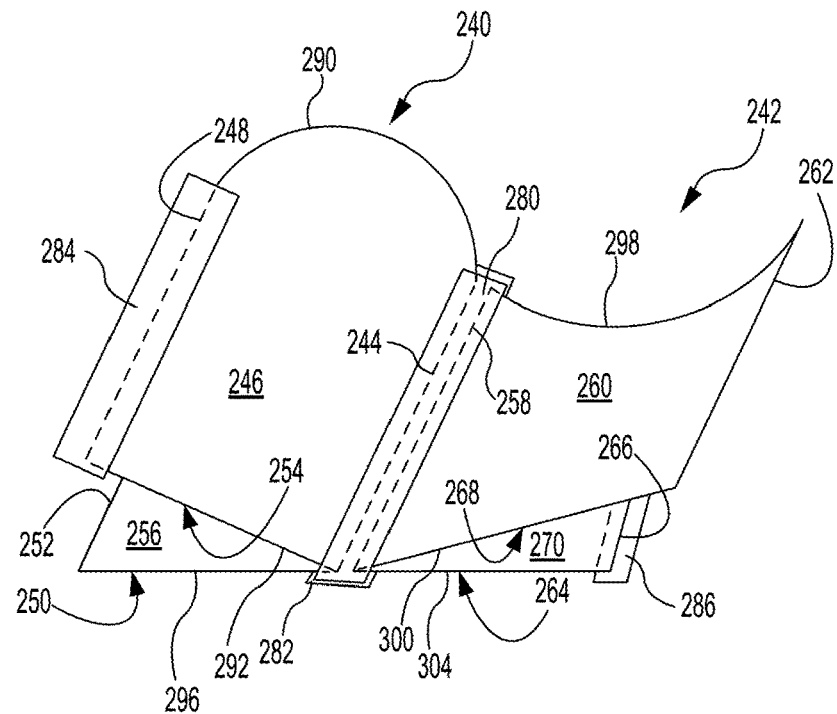

FIGS. 5A, 5B, 5C, and 5D illustrate formation of a stacked tube assembly having a miter joint end, in accordance with various embodiments. FIG. 5A shows a first panel 240 and a second panel 242 prior to folding. FIG. 5B shows first panel 240 and second panel 242 after each panel has been folded. With combined reference to FIGS. 5A and 5B, first panel 240 is folded to form a fold 244. First panel 240 includes a top tube interior surface portion 246 extending from fold 244 to a first circumferential end 248 of first panel 240. A bottom tube interior surface portion 250 of first panel 240 extends from fold 244 to a second circumferential end 252 of first panel 240. First circumferential end 248, second circumferential end 252 and fold 244 each extend in the longitudinal direction. In this regard, first circumferential end 248 and fold 244 may each extend between a first top longitudinal end 290 and a second top longitudinal end 292 of first panel 240. Second circumferential end 252 and fold 244 each extend between a first bottom longitudinal end 294 and a second bottom longitudinal end 296 of first panel 240.

First top longitudinal end 290 is formed as a convex curve. In this regard, a distance D1 between second top longitudinal end 292 and any point on first top longitudinal end 290 is greater than the distance D2 between second bottom longitudinal end 296 and first bottom longitudinal end 294. In various embodiments, second bottom longitudinal end 296 is substantially parallel to first bottom longitudinal end 294. As used in the previous context, the term "substantially" means ±5° from parallel.

First panel 240 is folded such that a top tube exterior surface portion 254 of first panel 240 is oriented toward a bottom tube exterior surface portion 256 of first panel 240. Top tube exterior surface portion 254 of first panel 240 is opposite top tube interior surface portion 246 of first panel 240. Top tube exterior surface portion 254 of first panel 240 extends from fold 244 to first circumferential end 248 of first panel 240, and from first top longitudinal end 290 to second top longitudinal end 292. Bottom tube exterior surface portion 256 of first panel 240 is opposite bottom tube interior surface portion 250 of first panel 240. Bottom tube exterior surface portion 256 of first panel 240 extends from fold 244 to second circumferential end 252 of first panel 240 and from first bottom longitudinal end 294 to second bottom longitudinal end 296. ridiculous In accordance with various embodiments, second panel 242 is folded to form a fold 258. Second panel 242 includes a top tube interior surface portion 260 extending from fold 258 to a first circumferential end 262 of second panel 242. A bottom tube interior surface portion 264 of second panel 242 extends from fold 258 to a second circumferential end 266 of second panel 242. First circumferential end 262, second circumferential end 266, and fold 258 each extend in the longitudinal direction. In this regard, first circumferential end 262 and fold 258 may each extend between a first top longitudinal end 298 and a second top longitudinal end 300 of second panel 242. Second circumferential end 266 and fold 258 each extend between a first bottom longitudinal end 302 and a second bottom longitudinal end 304 of second panel 242. First top longitudinal end 298 is formed as a concave curve. In this regard, a distance D3 between second top longitudinal end 300 and any point on first top longitudinal end 298 is less than the distance D4 between second bottom longitudinal end 304 and first bottom longitudinal end 302. In various embodiments, second bottom longitudinal end 304 is substantially parallel to first bottom longitudinal end 302. As used in the previous context, the term "substantially" means ±5° from parallel.

Second panel 242 is folded such that a top tube exterior surface portion 268 of second panel 242 is oriented toward a bottom tube exterior surface portion 270 of second panel 242. Top tube exterior surface portion 268 of second panel 242 is opposite top tube interior surface portion 260 of second panel 242. Top tube exterior surface portion 268 of second panel 242 extends from fold 258 to first circumferential end 262 of second panel 242, and from first top longitudinal end 298 to second top longitudinal end 300. Bottom tube exterior surface portion 270 of second panel 242 is opposite bottom tube interior surface portion 264 of second panel 242. Bottom tube exterior surface portion 270 of second panel 242 extends from fold 258 to second circumferential end 266 of second panel 242 and from first bottom longitudinal end 302 to second bottom longitudinal end 304.

With additional reference to FIG. 5C, a first seam tape 280 is bonded along fold 244 to top tube interior surface portion 246 of first panel 240 and along fold 258 to top tube interior surface portion 260 of second panel 242. First seam tape 280 may be bonded to top tube interior surface portions 246, 260 using an adhesive, radio frequency welding, heat bonding or any other suitable bonding means. Radio frequency welding and/or heat bonding may be employed to attach first seam tape 280, as top tube interior surface portions 246, 260 generally do not include aluminum coating.

A second seam tape 282 is bonded along fold 244 to bottom tube interior surface portion 250 of first panel 240 and along fold 258 to bottom tube interior surface portion 264 of second panel 242. Second seam tape 282 may be bonded to bottom tube interior surface portions 250, 264 using an adhesive, radio frequency welding, heat bonding or any other suitable bonding means. Radio frequency welding and/or heat bonding may be employed to attach second seam tape 282, as bottom tube interior surface portions 250, 264 generally do not include aluminum coating.

A third seam tape 284 is bonded to top tube interior surface portion 246 of first panel 240 along first circumferential end 248. Third seam tape 284 may be bonded to top tube interior surface portion 246 using an adhesive, radio frequency welding, heat bonding or any other suitable bonding means. Radio frequency welding and/or heat bonding may be employed to attach third seam tape 284, as top tube interior surface portion 246 generally does not include aluminum coating.

Fourth seam tape 286 is bonded to bottom tube interior surface portion 264 of second panel 242 along second circumferential end 266. Fourth seam tape 286 may be bonded to bottom tube interior surface portion 264 using an adhesive, radio frequency welding, heat bonding or any other suitable bonding means. Radio frequency welding and/or heat bonding may be employed to attach fourth seam tape 286, as bottom tube interior surface portion 264 generally does not include aluminum coating. It is contemplated and understood that fourth seam tape 286 may be bonded to bottom tube interior surface portion 250 of first panel 240 along second circumferential end 252.

Figure 5D:
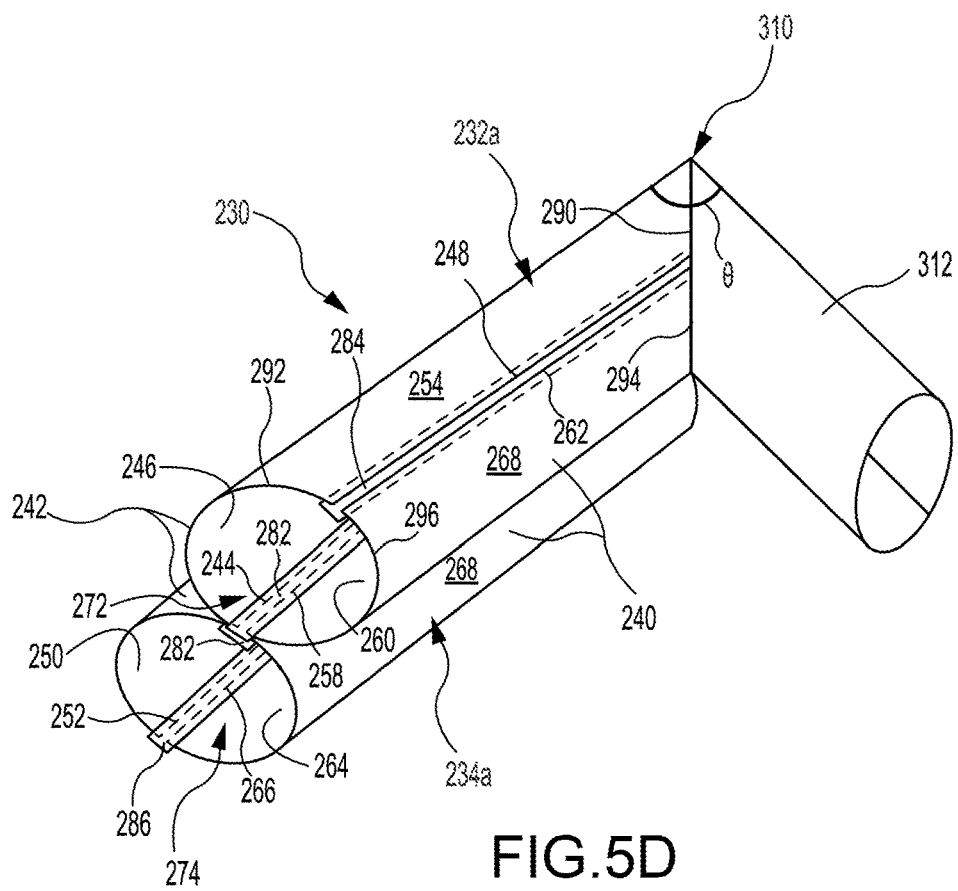

With reference to FIG. 5D, first circumferential end of 248 of first panel 240 and first circumferential end 262 of second panel 242 are brought together, and third seam tape 284 is bonded to top tube interior surface portion 260 of second panel 242 along first circumferential end 262, thereby forming a top longitudinal tube 232a of stacked tube assembly 230. Top tube interior surface portion 246 of first panel 240 and top tube interior surface portion 260 of second panel 242 define an internal volume 272 of top longitudinal tube 232a. While FIG. 5C illustrates third seam tape 284 as bonded to first panel 240 prior to second panel 242, it is contemplated and understood that third seam tape 284 may first be bonded to top tube interior surface portion 260 of second panel 242 along first circumferential end 262 and then bonded to top tube interior surface portion 246 of first panel 240. Third seam tape 284 may be bonded to top tube interior surface portion 260 using an adhesive, radio frequency welding, heat bonding or any other suitable bonding means. Radio frequency welding and/or heat bonding may be employed to attach third seam tape 284, as top tube interior surface portion 260 generally does not include aluminum coating.

Second circumferential end of 252 of first panel 240 and second circumferential end 266 of second panel 242 are brought together, and fourth seam tape 286 is bonded to bottom tube interior surface portion 250 of first panel 240 along second circumferential end 252, thereby forming a bottom longitudinal tube 234a of stacked tube assembly 230. Bottom tube interior surface portion 250 of first panel 240 and bottom tube interior surface portion 264 of second panel 242 define an internal volume 274 of bottom longitudinal tube 234a. While FIG. 5C illustrates fourth seam tape 286 as bonded to second panel 242 prior to first panel 240, it is contemplated and understood that fourth seam tape 286 may first be bonded to bottom tube interior surface portion 250 of first panel 240 along second circumferential end 252 and then bonded to bottom tube interior surface portion 264 of second panel 242. Fourth seam tape 286 may be bonded to bottom tube interior surface portion 250 using an adhesive, radio frequency welding, heat bonding or any other suitable bonding means. Radio frequency welding and/or heat bonding may be employed to attach fourth seam tape 286, as bottom tube interior surface portion 250 generally does not include aluminum coating.

In accordance with various embodiments, first top longitudinal end 290 of first panel 240 and first top longitudinal end 298 of second panel 242 form a miter joint 310. Miter joint 310 may allow an inflatable tube 312 to be bonded to top longitudinal tube 232a at an angle theta (θ) of between about 10° and about 170°, between about 30° and about 150°, between about 60° and about 120°, between about 80° and about 100°, or about 90°. As used in the previous context only, the term "about" means ±5°. In various embodiment, the center axis about which inflatable tube 312 is formed may be approximately normal to the center axis of first top longitudinal end 298. As used in the previous context only, the term "approximately" means ±10°.

Figure 6B:
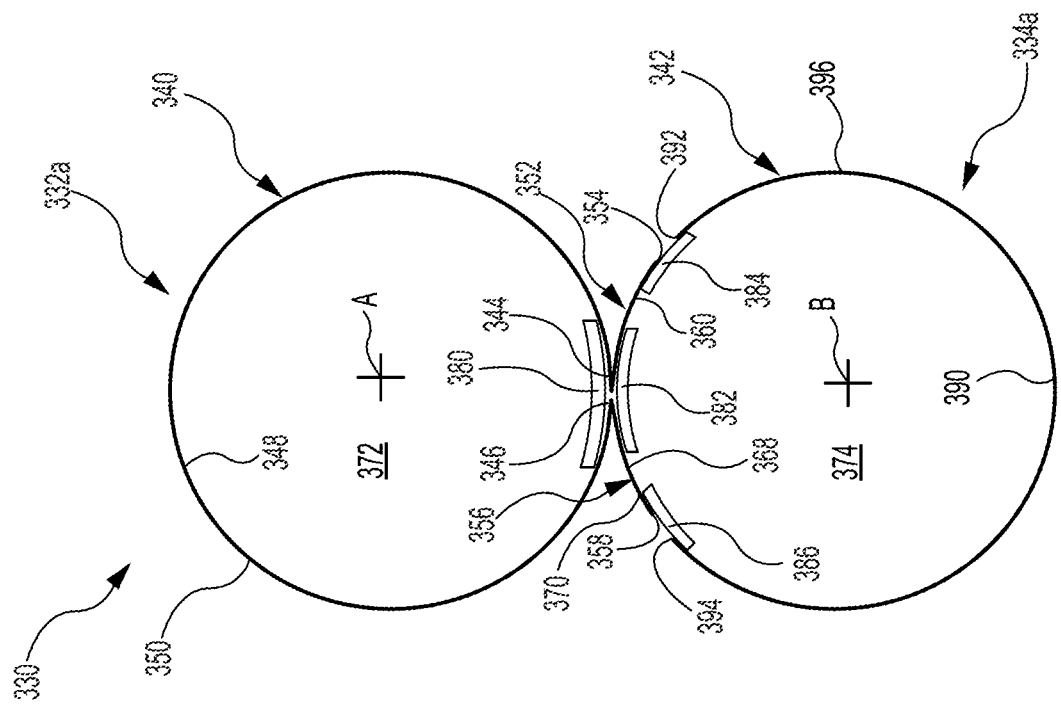
FIGS. 6A, 6B, and 6C illustrate formation of an inflation stacked tube assembly having a flanged tube, in accordance with various embodiments.
Figure 6A:
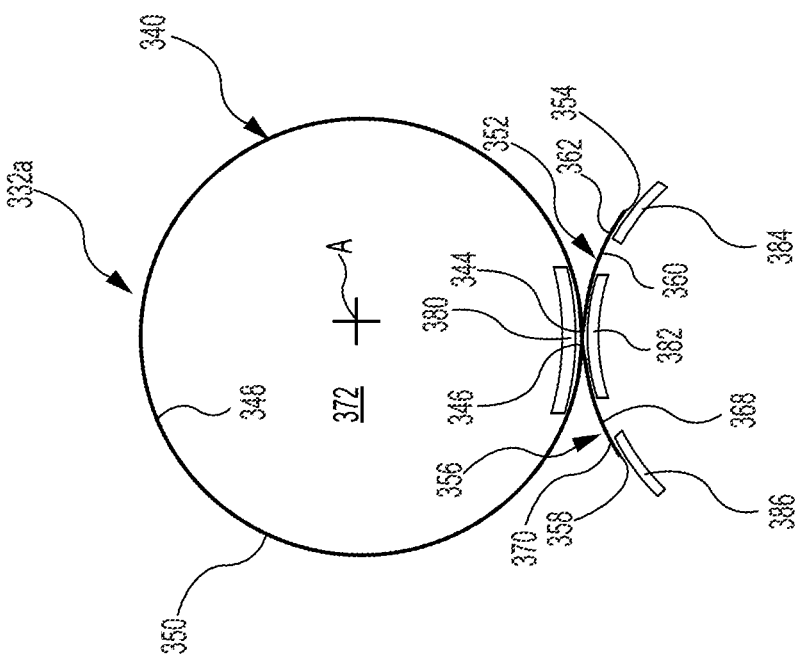
Figure 6C:
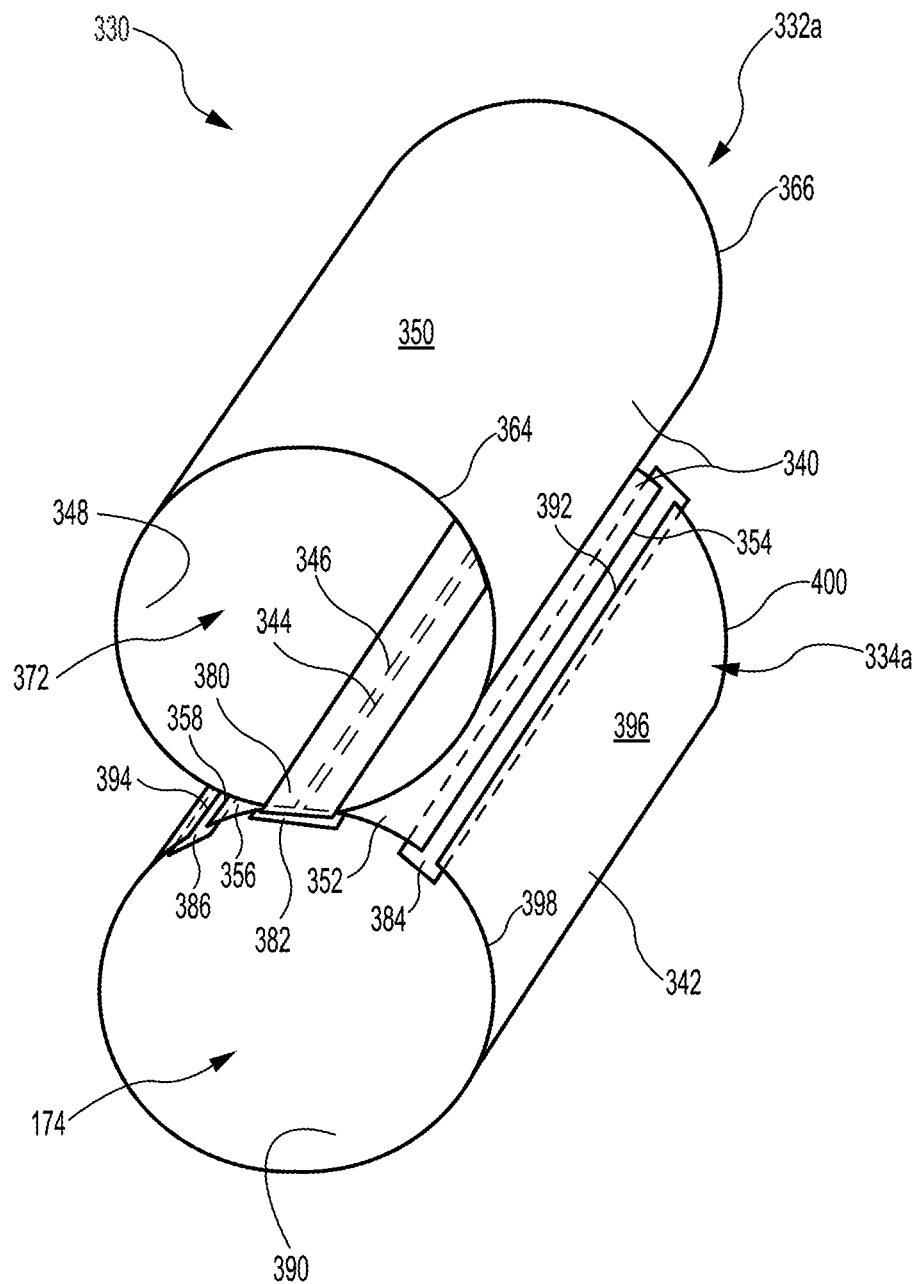

Referring now to FIGS. 6A, 6B, and 6C formation of a stacked tube assembly 330 using a flanged panel is illustrated, in accordance with various embodiments. With reference to FIG. 6A, a first panel 340 is folded to form a first fold 344 and a second fold 346. First panel 340 includes a top tube interior surface portion 348 extending from first fold 344 to second fold 346. First panel 340 includes a top tube exterior surface portion 350 extending from first fold 344 to second fold 346. Top tube interior surface portion 348 is oriented radially inward and toward center axis A of a top longitudinal tube 332a formed by first panel 340. Top tube exterior surface portion 350 of first panel 340 is opposite top tube interior surface portion 348 of first panel 340. In this regard, top tube exterior surface portion 350 is oriented radially outward and away from center axis A of top longitudinal tube 332a. First panel 340 may form approximately 360° of top longitudinal tube 332a. As used in the previous context only, the term "approximately" means ±5°.

First panel 340 includes a first flange 352 extending from first fold 344 to a first circumferential end 354 of first panel 340. First panel 340 includes a second flange 356 extending from second fold 346 to a second circumferential end 358 of first panel 340. First flange 352 includes a bottom tube interior surface portion 360 and a bottom tube exterior surface portion 362, opposite bottom tube interior surface portion 360. Each of bottom tube interior surface portion 360 and bottom tube exterior surface portion 362 extend from first fold 344 to first circumferential end 354 of first panel 340, and from a first longitudinal end 364 (FIG. 6C) of first panel 340 to a second longitudinal end 366 (FIG. 6C) of first panel 340. Each of top tube interior surface portion 348 and top tube exterior surface portion 350 from first longitudinal end 364 (FIG. 6C) to second longitudinal end 366 (FIG. 6C) of first panel 340. In various embodiments, first longitudinal end 364 (FIG. 6C) may be formed into a miter joint, similar to miter joint 310 in FIG. 5C. For example, a first portion of first longitudinal end 364 may be formed as a convex curve and a second portion of first longitudinal end 364 may be formed as a concave curve. The first portion of first longitudinal end 364 and the second portion of first longitudinal end 364 may collectively form 360° of top longitudinal tube 332a. For example, the convex curve and the concave curve may each extend approximately 180° about axis A. As used in the previous context only, "approximately" means ±10°.

Second flange 356 includes a bottom tube interior surface portion 368 and a bottom tube exterior surface portion 370, opposite bottom tube interior surface portion 368. Each of bottom tube interior surface portion 368 and bottom tube exterior surface portion 370 extend from second fold 346 to second circumferential end 358 of first panel 340, and from first longitudinal end 364 of first panel 340 to second longitudinal end 366 (FIG. 6C) of first panel 340.

A first seam tape 380 is bonded to top tube interior surface portion 348 along first fold 344 and second fold 346, thereby forming an inflatable volume, or chamber, 372 of top longitudinal tube 332a. First seam tape 380 may be bonded to top tube interior surface portion 348 using an adhesive, radio frequency welding, heat bonding or any other suitable bonding means. Radio frequency welding and/or heat bonding may be employed to attach first seam tape 380, as top tube interior surface portion 348 generally does not include aluminum coating. Top tube exterior surface portion 350 may include aluminum coating.

A second seam tape 382 is bonded to bottom tube interior surface portion 360 of first flange 352 along first fold 344. Second seam tape 382 is also bonded to bottom tube interior surface portion 368 of second flange 356 along second fold 346. Second seam tape 382 may be bonded to bottom tube interior surface portions 360, 368 using an adhesive, radio frequency welding, heat bonding or any other suitable bonding means. Radio frequency welding and/or heat bonding may be employed to attach second seam tape 382, as bottom tube interior surface portions 360, 368 generally do not include aluminum coating. Bottom tube exterior surface portion 362 of first flange 352 and bottom tube exterior surface portion 370 of second flange 356 may each include aluminum coating.

A third seam tape 384 is bonded to bottom tube interior surface portion 360 of first flange 352 along first circumferential end 354 of first panel 340. Third seam tape 384 may be bonded to bottom tube interior surface portion 360 using an adhesive, radio frequency welding, heat bonding or any other suitable bonding means. Radio frequency welding and/or heat bonding may be employed to attach third seam tape 384, as bottom tube interior surface portion 360 generally does not include aluminum coating.

A fourth seam tape 386 is bonded to bottom tube interior surface portion 368 of second flange 356 along second circumferential end 358 of first panel 340. Fourth seam tape 386 may be bonded to bottom tube interior surface portion 368 using an adhesive, radio frequency welding, heat bonding or any other suitable bonding means. Radio frequency welding and/or heat bonding may be employed to attach fourth seam tape 386, as bottom tube interior surface portion 368 generally does not include aluminum coating.

With reference to FIGS. 6B and 6C, a second panel 342 is bonded to first panel 340 to form a bottom longitudinal tube 334a of stacked tube assembly 330. Second panel 342 includes a bottom tube interior surface portion 390 extending from a first circumferential end 392 of second panel 342 to a second circumferential end 394 of second panel 342. Second panel 342 includes a bottom tube exterior surface portion 396 extending from first circumferential end 392 of second panel 342 to second circumferential end 394 of second panel 342. Bottom tube interior surface portion 390 is oriented radially inward and toward center axis B of bottom longitudinal tube 334a. Bottom tube exterior surface portion 396 of second panel 342 is opposite bottom tube interior surface portion 390 of second panel 342. In this regard, bottom tube exterior surface portion 396 is oriented radially outward and away from center axis B of bottom longitudinal tube 334a. Bottom tube interior surface portion 390 and bottom tube exterior surface portion 396 each extend from a first longitudinal end 398 (FIG. 6C) of second panel 342 to a second longitudinal end 400 (FIG. 6C) of second panel 342. Second longitudinal end 400 (FIG. 6A) is opposite first longitudinal end 398 (FIG. 6A). First and second longitudinal ends 398, 400 (FIG. 6C) of second panel 342 each extend from first circumferential end 392 of second panel 342 to second circumferential end 394 of second panel 342.

Bottom tube interior surface portion 360 of first flange 352 and bottom tube interior surface portion 368 of second flange 356 are oriented radially inward and toward center axis B of bottom longitudinal tube 334a. Bottom tube exterior surface portion 362 of first flange 352 and bottom tube exterior surface portion 370 of second flange 356 are oriented radially outward and away from center axis B of bottom longitudinal tube 334a.

In various embodiments, second panel 342 may form between approximately 180° and approximately 340° of bottom longitudinal tube 334a, and first and second flanges 352, 356 of first panel 340 may collectively form between approximately 20° and approximately 180° of bottom longitudinal tube 334a. As used in the previous context only, the term "approximately" means ±5°. In various embodiments, second panel 342 may form between approximately 270° and approximately 330° of bottom longitudinal tube 334a, and first and second flanges 352, 356 of first panel 340 may collectively form between approximately 30° and approximately 90° of bottom longitudinal tube 334a. As used in the previous context only, the term "approximately" means ±5°. Second panel 342 and first and second flanges 352, 356 of first panel 340 may collectively extend approximately 360° about center axis B. As used in the previous context only, the term "approximately" means ±5°.

In accordance with various embodiments, third seam tape 384 is bonded to bottom tube interior surface portion 390 of second panel 342 along first circumferential end 392 of second panel 342, and fourth seam tape 386 is bonded to bottom tube interior surface portion 390 of second panel 342 along second circumferential end 394 of second panel 342, thereby forming internal volume 374 of bottom longitudinal tube 334a. Third seam tape 384 may be bonded to bottom tube interior surface portion 390 using an adhesive, radio frequency welding, heat bonding or any other suitable bonding means. Radio frequency welding and/or heat bonding may be employed to attach third seam tape 384, as bottom tube interior surface portion 390 generally does not include aluminum coating. Fourth seam tape 386 may be bonded to bottom tube interior surface portion 390 using an adhesive, radio frequency welding, heat bonding or any other suitable bonding means. Radio frequency welding and/or heat bonding may be employed to attach fourth seam tape 386, as bottom tube interior surface portion 390 generally does not include aluminum coating. In various embodiments, bottom tube exterior surface portion 396 of second panel 342 may include aluminum coating.

Forming inflatable rail structure 130 in FIG. 3H, stacked tube assembly 230 in FIG. 5D, and/or stacked tube assembly 330 in FIG. 6C by bonding the seam tape to the interior, non-aluminized surface can enable heat sealing and/or radio frequency welding processes to be used. Heat sealing and radio frequency welding reduces the need to use adhesive bonding, which may decrease, or eliminate, the use of methyl ethyl ketone (MEK) in manufacturing. Heat sealing and radio frequency welding can also decrease manufacturing time as Heat sealing and radio frequency as heat sealing and radio frequency are not associated with a cure step, which generally takes between 4 and 8 hours. Bonding the seam tape to the interior surface also tends to increase bonding strength as the fluid pressure within the tubes. Bonding the seam tape to the interior surface can also decrease formation of wrinkles and/or channels, which reduces testing failures and/or a need for corrective operations where portions of the tube assembly are refabricated to correct the formation defects and/or occurrences where the tube assembly is discarded due to formation defects.

Figure 7:
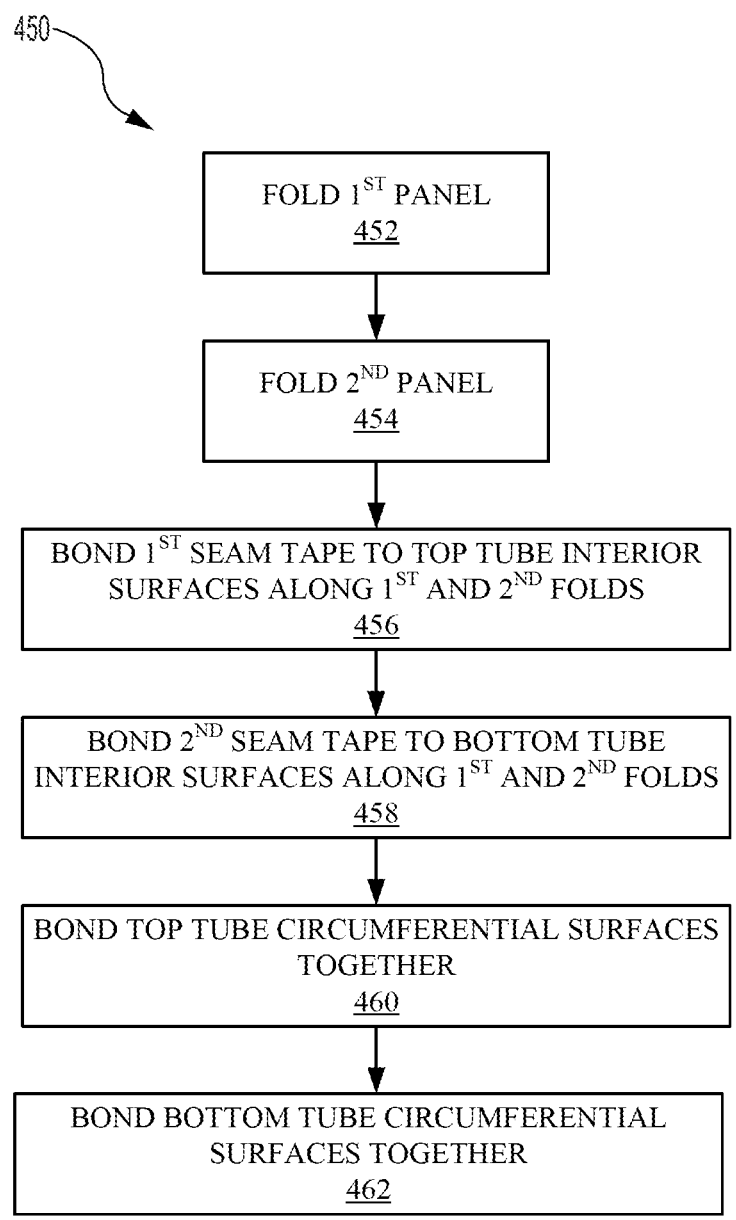
FIG. 7 illustrates a method of forming an inflatable stacked tube assembly, in accordance with various embodiments.

With reference to FIG. 7, a method 450 of forming an inflatable stacked tube assembly is illustrated. In accordance with various embodiments, method 450 includes folding a first panel to form a first fold and orient a first top tube exterior surface portion of the first panel toward a first bottom tube exterior surface portion of the first panel (step 452) and folding a second panel to form a second fold and orient a second top tube exterior surface portion of the second panel toward a second bottom tube exterior surface portion of the second panel (step 454). Method 450 further includes bonding a first seam tape to a first top tube interior surface portion of the first panel and to a second first top tube interior surface portion of the second panel (step 456). In various embodiments, the first seam tape is located along the first fold and the along the second fold, and the first top tube interior surface portion and the first top tube exterior surface portion each extend from the first fold to a first circumferential end of the first panel, and the second top tube interior surface portion and the second top tube exterior surface portion each extend from the second fold to a first circumferential end of the second panel.

Method 450 further includes bonding a second seam tape to a first bottom tube interior surface portion of the first panel and a second bottom tube interior surface portion of the second panel (step 458). In various embodiments, the second seam tape is located along the first fold and the along the second fold, and the first bottom tube interior surface portion and the first bottom tube exterior surface portion each extend from the first fold to a second circumferential end of the first panel, and the second bottom tube interior surface portion and the second bottom tube exterior surface portion each extend from the second fold to a second circumferential end of the second panel.

Method 450 further includes coupling the first circumferential end of the first panel to the first circumferential end of the second panel (step 460) and coupling the second circumferential end of the first panel to the second circumferential end of the second panel (step 462).

In various embodiments, step 460 includes bonding a third seam tape to the first top tube interior surface portion of the first panel, with the third seam tape located along the first circumferential end of the first panel, and bonding the third seam tape to the second top tube interior surface portion of the second panel, with the third seam tape located along the first circumferential end of the second panel.

In various embodiments, step 462 includes bonding a fourth seam tape to the first bottom tube interior surface portion of the first panel, with the fourth seam tape located along the second circumferential end of the first panel, and bonding the fourth seam tape to the second bottom tube interior surface portion of the second panel, with the fourth seam tape located along the second circumferential end of the second panel.

In various embodiments, step 456 and/or step 458 may include using at least one of radio frequency welding or heat bonding to bond the seam tape. In various embodiments, method 450 may further include forming a top longitudinal end of the first panel as a convex curve, with the top longitudinal end of the first panel extending from the first fold to the first circumferential end of the first panel, and forming a top longitudinal end of the second panel as a concave curve, with the top longitudinal end of the second panel extending from the first fold to the first circumferential end of the first panel. In various embodiments, method 450 may further include bonding an inflatable tube to the top longitudinal end of the first panel and the top longitudinal end of the second panel.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable stacked tube assembly, comprising:
a first panel forming a first portion of a top tube and a first portion of a bottom tube;
a second panel forming a second portion of the top tube a second portion of the bottom tube; and
a first seam tape bonded to a first top tube interior surface portion of the first panel and a second top tube interior surface portion of the second panel, wherein the first seam tape is located along a first fold formed by the first panel and along a second fold formed by the second panel.

2. The inflatable stacked tube assembly of claim 1, further comprising a second seam tape bonded to a first bottom tube interior surface portion of the first panel and a second bottom tube interior surface portion of the second panel, wherein the second seam tape is located along the first fold of the first panel and along the second fold of the second panel.

3. The inflatable stacked tube assembly of claim 2, further comprising a third seam tape bonded to the first top tube interior surface portion of the first panel and the second top tube interior surface portion of the second panel, wherein the third seam tape is located along a first circumferential end of the first panel and along a first circumferential end of the second panel.

4. The inflatable stacked tube assembly of claim 3, further comprising a fourth seam tape bonded to the first bottom tube interior surface portion of the first panel and the second bottom tube interior surface portion of the second panel, wherein the fourth seam tape is located along a second circumferential end of the first panel and along a second circumferential end of the second panel.

5. The inflatable stacked tube assembly of claim 4, wherein the first panel forms approximately 180° of the top tube and 180° of the bottom tube.

6. The inflatable stacked tube assembly claim 5, wherein a first longitudinal end of the first panel is formed as a convex curve, the first longitudinal end of the first panel extending from the first fold to the first circumferential end of the first panel, and wherein a first longitudinal end of the second panel is formed as a concave curve, the first longitudinal end of the second panel extending from the second fold to the first circumferential end of the second panel.

7. The inflatable stacked tube assembly of claim 6, wherein a first top tube exterior surface portion of the first panel and a second top tube exterior surface portion of the second panel each include an aluminum coating, the first top tube exterior surface portion of the first panel being opposite the first top tube interior surface portion of the first panel, the second top tube exterior surface portion of the second panel being opposite the second top tube interior surface portion of the second panel.

8. An inflatable stacked tube assembly, comprising:
a first panel forming a top tube, the first panel including a first fold, a second fold, a first top tube interior surface portion, a first flange, and a second flange, wherein the first top tube interior surface portion extends from the first fold to the second fold, wherein the first flange extends from the first fold to a first circumferential end of the first panel, and wherein the second flange extends from the second fold to a second circumferential end of the first panel;
a second panel bonded to the first panel and forming a portion of a bottom tube, the second panel including a bottom tube interior surface portion extending from a first circumferential end of the second panel to a second circumferential end of the second panel; and
a first seam tape bonded to the first top tube interior surface portion, wherein the first seam tape is located along the first fold and along the second fold.

9. The inflatable stacked tube assembly of claim 8, further comprising a second seam tape bonded to a first bottom tube interior surface portion of the first flange and a second bottom tube interior surface portion of the second flange, wherein the second seam tape is located along the first fold and along the second fold.

10. The inflatable stacked tube assembly of claim 9, further comprising a third seam tape bonded to the first bottom tube interior surface portion of the first flange and the bottom tube interior surface portion of the second panel, wherein the third seam tape is located along the first circumferential end of the first panel and along the first circumferential end of the second panel.

11. The inflatable stacked tube assembly of claim 10, further comprising a fourth seam tape bonded to the second bottom tube interior surface portion of the second flange and the bottom tube interior surface portion of the second panel, wherein the fourth seam tape is located along the second circumferential end of the first panel and along the second circumferential end of the second panel.

12. The inflatable stacked tube assembly of claim 11, wherein a first portion of a top longitudinal end of the first panel forms a convex curve, and wherein a second portion of the top longitudinal end of the first panel forms a concave curve, the top longitudinal end extending from the first fold to the second fold.

13. The inflatable stacked tube assembly claim 11, wherein the second panel forms between approximately 180° and 340° of the bottom tube.

14. A method of forming an inflatable stacked tube assembly, comprising:
  folding a first panel to form a first fold and orient a first top tube exterior surface portion of the first panel toward a first bottom tube exterior surface portion of the first panel;
  folding a second panel to form a second fold and orient a second top tube exterior surface portion of the second panel toward a second bottom tube exterior surface portion of the second panel;
  bonding a first seam tape to a first top tube interior surface portion of the first panel and a second first top tube interior surface portion of the second panel, wherein the first seam tape is located along the first fold and the along the second fold, wherein the first top tube interior surface portion and the first top tube exterior surface portion each extend from the first fold to a first circumferential end of the first panel, and wherein the second top tube interior surface portion and the second top tube exterior surface portion each extend from the second fold to a first circumferential end of the second panel;
  bonding a second seam tape to a first bottom tube interior surface portion of the first panel and a second bottom tube interior surface portion of the second panel, wherein the second seam tape is located along the first fold and the along the second fold, wherein the first bottom tube interior surface portion and the first bottom tube exterior surface portion each extend from the first fold to a second circumferential end of the first panel, and wherein the second bottom tube interior surface portion and the second bottom tube exterior surface portion each extend from the second fold to a second circumferential end of the second panel;
  coupling the first circumferential end of the first panel to the first circumferential end of the second panel; and
  coupling the second circumferential end of the first panel to the second circumferential end of the second panel.

15. The method of claim 14, wherein coupling the first circumferential end of the first panel to the first circumferential end of the second panel comprises:
  bonding a third seam tape to the first top tube interior surface portion of the first panel, wherein the third seam tape is located along the first circumferential end of the first panel; and
  bonding the third seam tape to the second top tube interior surface portion of the second panel, wherein the third seam tape is located along the first circumferential end of the second panel.

16. The method of claim 15, wherein coupling the second circumferential end of the first panel to the second circumferential end of the second panel comprises:
  bonding a fourth seam tape to the first bottom tube interior surface portion of the first panel, wherein the fourth seam tape is located along the second circumferential end of the first panel; and
  bonding the fourth seam tape to the second bottom tube interior surface portion of the second panel, wherein the fourth seam tape is located along the second circumferential end of the second panel.

17. The method of claim 16, further comprising using at least one of radio frequency welding or heat bonding to bond the first seam tape to the first top tube interior surface portion of the first panel and the second first top tube interior surface portion of the second panel.

18. The method of claim 17, further comprising forming a top longitudinal end of the first panel as a convex curve, the top longitudinal end of the first panel extending from the first fold to the first circumferential end of the first panel.

19. The method of claim 18, further comprising forming a top longitudinal end of the second panel as a concave curve, the top longitudinal end of the second panel extending from the first fold to the first circumferential end of the first panel.

20. The method of claim 19, further comprising bonding an inflatable tube to the top longitudinal end of the first panel and the top longitudinal end of the second panel.

* * * * *